US008644376B2

(12) United States Patent
Jiang et al.

(10) Patent No.: US 8,644,376 B2
(45) Date of Patent: Feb. 4, 2014

(54) APPARATUS AND METHOD FOR GENERATING COMPRESSIVE MEASUREMENTS OF VIDEO USING SPATIAL AND TEMPORAL INTEGRATION

(75) Inventors: Hong Jiang, Warren, NJ (US); Gang Huang, Monroe Township, NJ (US); Paul Wilford, Bernardsville, NJ (US)

(73) Assignee: Alcatel Lucent, Paris (FR)

( * ) Notice: Subject to any disclaimer, the term of this patent is extended or adjusted under 35 U.S.C. 154(b) by 284 days.

(21) Appl. No.: 12/894,855

(22) Filed: Sep. 30, 2010

(65) Prior Publication Data

US 2012/0082205 A1 Apr. 5, 2012

(51) Int. Cl.
*H03D 3/24* (2006.01)

(52) U.S. Cl.
USPC .......... 375/240

(58) Field of Classification Search
USPC .......... 375/240.01
See application file for complete search history.

(56) References Cited

U.S. PATENT DOCUMENTS 3,775,602 A * 11/1973 Alexandridis et al. ........ 708/401
5,070,403 A * 12/1991 Wilkinson ........ 375/240.14
5,166,788 A * 11/1992 Lee ........ 348/699
5,262,854 A * 11/1993 Ng ........ 375/240.24
5,555,023 A * 9/1996 Maenaka et al. ........ 348/253
5,572,552 A * 11/1996 Dent et al. ........ 375/343
5,870,144 A 2/1999 Guerrera
6,148,107 A 11/2000 Ducloux et al.
6,356,324 B1 3/2002 Nishiguchi et al.
6,718,287 B2 * 4/2004 Oostveen et al. ........ 702/189
7,345,603 B1 3/2008 Wood et al.
7,680,356 B2 * 3/2010 Boyce et al. ........ 382/275
8,125,883 B2 * 2/2012 Aulin ........ 370/203
8,204,126 B2 * 6/2012 Tsuda et al. ........ 375/240.16
2003/0043918 A1 * 3/2003 Jiang et al. ........ 375/240.25
2003/0197898 A1 10/2003 Battiato et al.
2004/0264580 A1 12/2004 Chiang Wei Yin et al.
2005/0207498 A1 * 9/2005 Vitali et al. ........ 375/240.16
2006/0203904 A1 * 9/2006 Lee ........ 375/240.1
2006/0239336 A1 * 10/2006 Baraniuk et al. ........ 375/216
2007/0285554 A1 12/2007 Givon
2008/0025624 A1 1/2008 Brady
2008/0152296 A1 6/2008 Oh et al.
2010/0091134 A1 * 4/2010 Cooke et al. ........ 348/229.1
2010/0165163 A1 7/2010 Matsuda (Continued)

OTHER PUBLICATIONS

CCD and CMOS sensor technology, 2010, Axis Communications, pp. 1-8.*

(Continued)

*Primary Examiner* — Sath V Perungavoor
*Assistant Examiner* — Peter D Le
(74) *Attorney, Agent, or Firm* — Harness, Dickey & Pierce

(57) ABSTRACT

The present invention relates to an apparatus and method for generating compressive measurements of video using spatial-temporal integration. The apparatus includes a detector configured to detect luminance values of a temporal video structure over a period of time based on optical data. The temporal video structure has pixels with a horizontal dimension and a vertical dimension with corresponding luminance values over the period of time. The apparatus also includes a spatial-temporal integrator unit configured to receive a plurality of measurement bases. Also, the spatial-temporal integrator unit is configured to apply each measurement basis to the temporal video structure and to sum resulting values for each measurement basis over the period of time to obtain a set of measurements. The summed values for each measurement basis is the set of measurements.

20 Claims, 6 Drawing Sheets

(56) References Cited

U.S. PATENT DOCUMENTS

| | | | | |
|---|---|---|---|---|
| 2010/0189172 A1 | 7/2010 | Pateux et al. | | |
| 2011/0150084 A1* | 6/2011 | Choi et al. | ............... | 375/240.12 |
| 2011/0150087 A1 | 6/2011 | Kim et al. | | |
| 2012/0082208 A1 | 4/2012 | Jiang et al. | | |
| 2012/0189047 A1* | 7/2012 | Jiang et al. | ............... | 375/240.01 |

OTHER PUBLICATIONS

Jan Bogaerts et al., High-End CMOS Active Pixel Sensors for Space-Borne Imaging Instruments, 2005, FillFactory, pp. 1-9.*

Roger William Doering, A Tricolor-Pixel Digital-Micromirror Video Chip, 2001, UCLA, pp. 1-180.*

Tarek Ouni et al., New low complexity DCT based video compression method, 2009, ICT 09, pp. 202-207.*

R. Turchetta, et al., Monolithic active pixel sensor (MAPS) in VLSI CMOS technology, 2003, Science Direct, pp. 1-9.*

Sahng-Gyu Park, Adaptive Lossless Video Compression, 2003, Purdue University, pp. 1-105.*

Cossalter M. et al., "Joint Compressive Video Coding and Analysis," IEEE Transactions on Multimedia, IEEE Service Center, Piscataway, NJ, US, vol. 12, No. 3, Apr. 1, 2010, pp. 168-183, XP011346672.

Dadkhan M.R. et al., "Compressive Sensing with Modified Total Variation Minimization Algorithm," Acoustic Speech and Signal Processing (ICASSP), 2010 IEEE International Conference ON, IEEE, Piscataway, NJ, USA, Mar. 14, 2010, pp. 1310-1313, XP031697373.

Huihui Bai et al., "Compressive Sensing for DCT Image," Computational Aspects of Social Networks (CASON), 2010 International Conference ON, IEEE, Piscataway, NJ, USA, Sep. 26, 2010, pp. 378-381, XP031802282.

Duarte M.F. et al., "Single-Pixel Imaging via Compressive Sampling," IEEE Signal Processing Magazine, IEEE Service Center, Piscataway, NJ, US, vol. 25, No. 2, Mar. 1, 2008, pp. 83-91, XP011225667.

Chengbo Li, "An Efficient Algorithm for Total Variation Regularization with Applications to the Single Pixel Camera and Compressive Sensing," Thesis Submitted in Partial Fulfillment of the Requirements for the Degree Master of Arts, Sep. 30, 2009, pp. 1-93, XP55010819, Retrieved from the internet: URL:http://scholarship.rice.edu/bitstream/handle/1911/62229/1486057.PDF?sequence=1 [Retrieved Oct. 31, 2011].

Chengbo Li et al., "Video Coding Using Compressive Sensing for Wireless Communications," Wireless Communications and Networking Conference (WCNC), 2011 IEEE, IEEE, Mar. 28, 2011, pp. 2077-2082, XP031876593.

Hong Jiang et al., "Arbitrary Resolution Video Coding Using Compressive Sensing," Workshop on Picture Coding and Image Processing 2010, Dec. 7, 2010 XP030082080.

International Search Report dated Nov. 14, 2011 for Application No. PCT/US2011/051726.

Robucci, Ryan, et al., "Compressive Sensing on a CMOS Seperable Transform Image Sensor," pp. 5125-5128, IEEE, 2008.

International Search Report and Written Opinion for PCT/US2011/051730 dated Dec. 15, 2011.

Dugad, R. et al., "A Fast Scheme for Image Size Change in the Compressed Domain," IEEE Transactions on Circuits and Systems for Video Technology, vol. 11, No. 4, Apr. 1, 2011.

Deng, C. et al., "Robust image compression based on compressive sensing," Multimedia and Expo (ICME), Jul. 19, 2012, pp. 462-467.

Hyder, M. et al., "A Scalable Distributed Video Coder Using Compressed Sensing," India Conference, Dec. 8, 2009, pp. 1-4.

Gao, D. et al., "A Robust Image Transmission Scheme for Wireless Channels Based on Compressive Sensing," Aug. 18, 2012, pp. 334-341.

International Search Report dated Feb. 29, 2012.

Park and Wakin, "A multiscale framework for compressive sensing of video," in Picture Coding Simposium, Chicago, IL, May 2009.

Drori, Iddo, "Compressed Video Sensing", BMVA symposium on 3D video analysis, display, and applications, 2008.

Wakin et al., "Compressive imaging for video representation and coding", in Picture Coding Symposium, (Beijing, China), Apr. 2006.

Office Action issued in co-pending U.S. Appl. No. 12/894,807 on Nov. 21, 2012.

Office Action issued in co-pending U.S. Appl. No. 12/894,757 on Dec. 4, 2012.

Office Action issued in co-pending U.S. Appl. No. 12/894,757 on Mar. 20, 2013.

Office Action issued in co-oending U.S. Appl. No. 13/182,856 on Aug. 16, 2013.

* cited by examiner

100
Object
101
Optical lens
105
Spatial and temporal Integrator
110
Measurement basis storage
115
Compressive measurements
Storage Unit
120
Transmitter
125

110
301
CMOS
j
i
302
Pixel access
$B_m(i,j,t)$
202-1
202-2
202-M
$B_1(i,j,t)$
$B_2(i,j,t)$
$B_M(i,j,t)$
203-1
203-2
203-M
204-1
204-2
204-M
ADC
$Y_1$
$Y_2$
$Y_M$
ADC sample
rate=1/T 110
CMOS
301
j
i
Pixel access
302
P(i,j,t)S_m(t)
1
2
M
203-1
203-2
203-M
204-1
204-2
204-M
ADC
ADC
ADC
Y_1
Y_2
Y_M
ADC sample rate=1/T

APPARATUS AND METHOD FOR GENERATING COMPRESSIVE MEASUREMENTS OF VIDEO USING SPATIAL AND TEMPORAL INTEGRATION

BACKGROUND

An image or video camera captures a significant amount of data when acquiring image or video data. In order to store or transmit the acquired data, this data is typically compressed after the video is captured. This compression typically exploits a priori knowledge such as the fact that an N-pixel image can be approximated as a sparse linear combination of wave-length coefficients K, which are less than the N pixels. The wavelength coefficients can be computed from the N pixel values, and then stored or transmitted along with their locations. The standard procedure for transform coding of sparse signals is to acquire the full N-sample signal, compute the complete set of transform coefficients, locate the K largest, significant coefficients and discard the many small coefficients, and encode the values and locations of the largest coefficients. When N is large and K is small, this process is inefficient. However, acquiring large amounts of raw image or video data (large N) can be expensive, particularly at wavelengths where CMOS or CCD sensing technology is limited. Also, compressing raw data can be computationally demanding.

One conventional approach uses compressive imaging to directly acquire random projections without first collecting the N pixels. For instance, the conventional approach applies a measurement basis to the data captured by the optical lens (e.g., before the pixel values are obtained) to obtain a series of measurements, which represent the encoded data. As such, the conventional method directly acquires the reduced set of measurements of an N-pixel image without first acquiring the N pixel values. However, this conventional approach has disadvantages when capturing video data. For example, the conventional approach performs only spatial projection/integration using snapshots of an image without temporal integration. Video data is localized into a different two-dimensional (2D) snapshot for each measurement. As such, this method loses information between snapshots, or must acquire a large amount of data to capture fast actions.

SUMMARY

The present invention relates to an apparatus and method for generating compressive measurements of video using spatial-temporal integration.

The apparatus includes a detector configured to detect luminance values of a temporal video structure over a period of time based on optical data. The temporal video structure has pixels with a horizontal dimension and a vertical dimension with corresponding luminance values over the period of time. The apparatus also includes a spatial-temporal integrator unit configured to receive a plurality of measurement bases. Each measurement basis, has the same horizontal and vertical dimensions as the temporal video structure with corresponding assigned values over the period of time. Also, the spatial-temporal integrator unit is configured to apply each measurement basis to the temporal video structure and to sum resulting values for each measurement basis over the period of time to obtain a set of measurements. The summed values for each measurement basis is the set of measurements.

According to an embodiment the spatial-temporal integrator unit may include a plurality of multipliers, where each multiplier is configured to multiply the detected luminance values of the temporal video structure with a corresponding measurement basis. The spatial-temporal integrator unit may include a plurality of integrators, where each integrator is connected to a corresponding multiplier and configured to sum output of the corresponding integrator over the period of time.

According to another embodiment, the spatial-temporal integrator unit may include a pixel access configured to receive the plurality of measurement bases and access the luminance values detected by the detector based on the assigned values of the measurement bases, a plurality of multipliers, where each multiplier is configured to multiply the accessed luminance values of the temporal video structure with a corresponding measurement basis, and a plurality of integrators, where each integrator is connected to a corresponding multiplier and configured to sum output of the corresponding integrator over the period of time.

According to an embodiment, each measurement basis includes a basis component that has first assigned values, and a time division component that has a plurality of non-overlapping time slots of equal length within the period of time, where the time slots have second assigned values.

According to one embodiment, the spatial-temporal integrator unit includes a photon detector that is configured to detect luminance values based on the first assigned values, a multiplexer configured to select at least one of the detected luminance values based on the second assigned values, and a plurality of integrators configured to sum the selected luminance values for each measurement basis over the period of time.

According to another embodiment, the spatial-temporal integrator unit includes a pixel access configured to access the luminance values detected by the detector based on the first and second assigned values, and a plurality of integrators configured to sum the accessed luminance values for each measurement basis over the period of time.

The first and second assigned values may be binary values of 0 or 1. The detector may include a charge-coupled device (CCD), a complementary metal-oxide-semiconductor (CMOS), or micromirrors, for example. The set of measurement bases may be constructed using a randomly permutated Walsh-Hadamard matrix. The assigned values may be binary values of 0 or 1.

The method may include detecting luminance values of a temporal video structure over a period of time based on optical data. The temporal video structure has pixels with a horizontal dimension and a vertical dimension with corresponding luminance values over the period of time. The method includes receiving a plurality of measurement bases, where each measurement basis has the same horizontal and vertical dimensions as the temporal video structure with corresponding assigned values over the period of time. The method further includes applying each measurement basis to the temporal video structure, and summing resulting values over the period of time for each measurement basis to obtain a set of measurements. The summed values for each measurement basis is the set of measurements.

The method may further include multiplying the detected luminance values of the temporal video structure with a corresponding measurement basis, and summing results of the multiplying step over the period of time for each measurement basis.

In other embodiment, the method may include accessing the luminance values detected by the detector based on the assigned values of the measurement bases, multiplying the accessed luminance values of the temporal video structure with a corresponding measurement basis, and summing results of the multiplying step over the period of time for each measurement basis.

In one embodiment, each measurement basis includes a basis component that has first assigned values, and a time division component that has a plurality of non-overlapping time slots of equal length within the period of time, where the time slots have second assigned values.

The method may include detecting luminance values based on the first assigned values, selecting at least one of the detected luminance values based on the second assigned values, and summing the selected luminance values for each measurement basis over the period of time.

In another embodiment, the method may include accessing luminance values detected by the detector based on the first and second assigned values, and summing the accessed luminance values for each measurement basis over the period of time. The first and second assigned values may be binary values of 0 or 1. The set of measurement bases may be constructed using a randomly permutated Walsh-Hadamard matrix.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
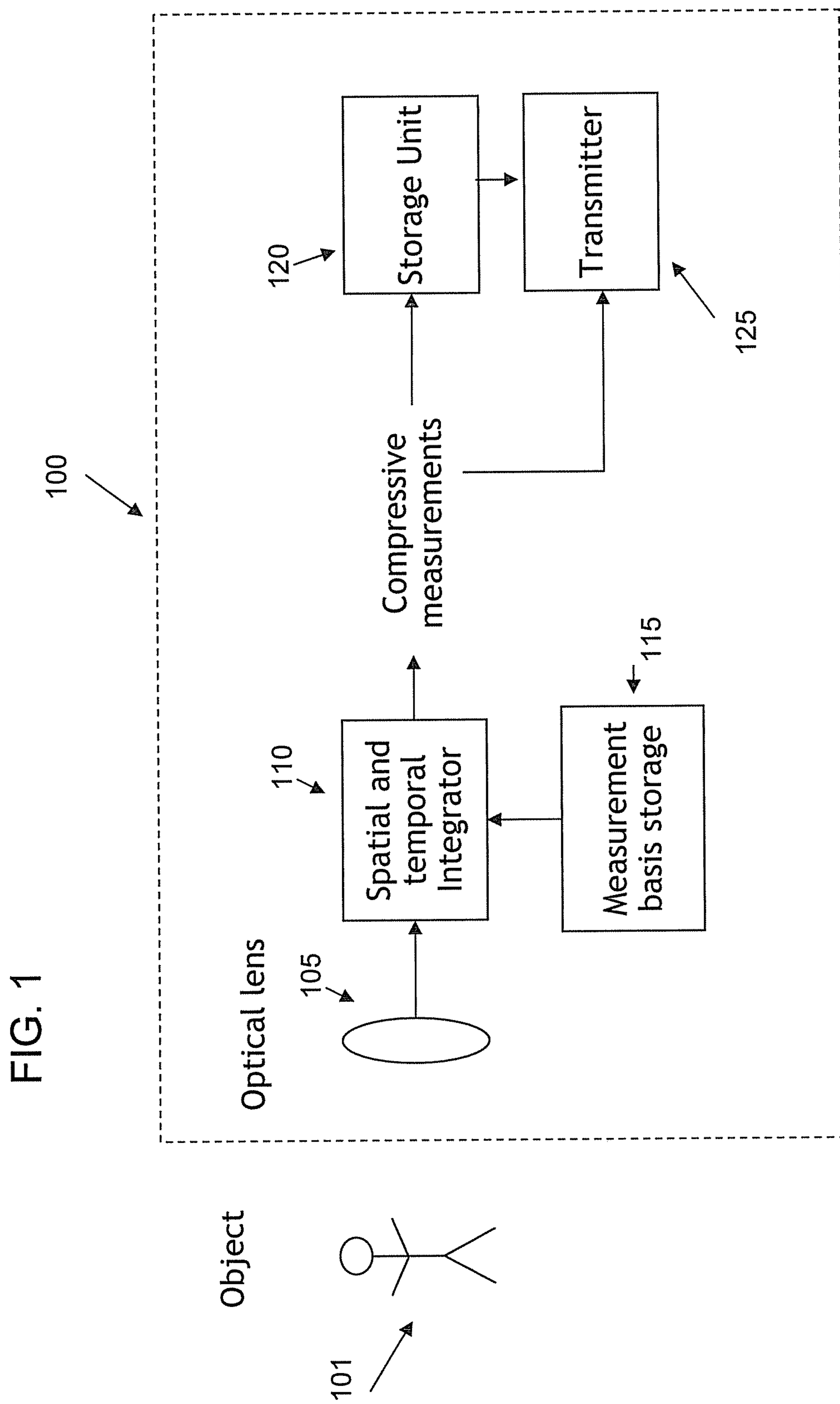
FIG. 1 illustrates an apparatus including a spatial and temporal integrator according to an embodiment of the present invention.

Various embodiments of the present invention will now be described more fully with reference to the accompanying drawings. Like elements on the drawings are labeled by like reference numerals.

As used herein, the singular forms “a”, “an”, and “the” are intended to include the plural forms as well, unless the context clearly indicates otherwise. It will be further understood that the terms “comprises”, “comprising,”, “includes” and “including”, when used herein, specify the presence of stated features, integers, steps, operations, elements, and/or components, but do not preclude the presence or addition of one or more other features, integers, steps, operations, elements, components, and/or groups thereof.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

Embodiments of the present invention provide an apparatus that includes a spatial and temporal integrator that receives optical data and generates a set of measurements.

FIG. 1 illustrates an apparatus 100 including the spatial and temporal integrator 110 according to an embodiment of the present invention. The apparatus 100 may be any type of device capable of acquiring video data such as cameras, camera systems, mobile video phones, personal computer systems, smart phones or any type of computing device, for example. The apparatus 100 includes an optical lens 105, the spatial and temporal integrator 110, and a measurement bases storage 115. The apparatus 100 may also include a storage unit 120 and/or a transmitter 125. In addition, the apparatus 100 may include other components that are well known in the art such as a shutter, for example.

The optical lens 105 may be any type of lens with axial symmetry that transmits and refracts light for capturing video data. The measurement bases storage 115 stores a measurement matrix to be applied to the optical data from the optical lens 105. The measurement matrix includes a pattern of assigned values. Also, the measurement matrix may be represented by a set of measurements bases. The terms measurement bases and measurement matrix may be used interchangeably. The pattern of assigned values of the measurement matrix may be constructed using a randomly permutated Walsh-Hadamard matrix. However, embodiments of the present invention encompass any type of measurement matrix. The spatial and temporal integrator 110 receives the optical data from the optical lens 105 and the measurement bases from the measurement bases storage 115, and generates a set of compressive measurements. For instance, the integration is performed in both space and time. As such, more video information is captured with spatial-temporal integration.

The spatial and temporal integrator 110 applies each measurement basis to video data to make measurements of the video data. The video data may be detected by any type of a light source detector such as a charge-coupled device (CCD), a Complementary metal-oxide-semiconductor (CMOS), or micromirrors, for example. Embodiments of the present invention encompass black/white video data and color video data.

The detected video data includes frames of video during a time period (e.g., 0.1 seconds). The video data may be represented by a 3-dimensional (3D) temporal video structure $V(i,j,t)$, where i is the horizontal dimension of a frame, $1<=i<=I$, j is the vertical dimension of a frame, $1<=j<=J$, t is the time dimension, $1<=t<=T$. In a specific example, the temporal video structure may include 6 frames of 640×480, where $I=640$, $J=480$, $T=6$. However, embodiments of the present invention encompass any type of value for I, J, and T. The temporal video structure may be associated with a luminance V. As such, the detected video structure may include pixels having horizontal dimension i and vertical dimension j with corresponding luminance values over the period of time T.

According to an embodiment, the set of measurement bases includes M video structures. For example, each measurement basis has the same video structure (i,j,t) as the video structure described above. The set of measurement bases includes M video structures (i,j,t), where M is the number of measurement bases. The parameter M also corresponds to the number of measurements. For example, the set of measurement bases may be represented by:

$$B_m(i,j,t), m=1, 2, \ldots M, 1<=i<=I, 1<=j<=J\ 1<=t<=T.$$

The set of measurement bases $B_m$ may be generated randomly with values that are pre-assigned. In other words, each measurement basis (1 to M) has horizontal dimension i and vertical dimension j with corresponding assigned values over the period of time T.

The spatial-temporal integrator 110 receives the set of measurement bases. Also, the spatial-temporal integrator applies each measurement basis (1 to M) to the detected luminance values of the temporal video structure by integrating the pixels over all values of i, j and t to generate the set of measurements (e.g., $Y_m$), which is coded data representing temporal video structure. For example, the measurements $Y_m$ of the temporal video structure V(i,j,t) in the above measurement basis is:

$$Y_m = \int_t \sum_{i,j} V(i, j, t) B_m(i, j, t) dt$$

The integration is performed over all values of i, j, t. As such, the spatial-temporal integrator 110 computes, for given measurement basis $B_m$, the measurements $Y_m$ of the temporal video structure. For color video data, the spatial-temporal integrator 110 computes the measurements $Y_m$ for each color (red, green, blue) in the RGB color scheme.

The storage unit 120 may store the set of compressive measurements. Also, the measurement bases storage 115 and the storage 120 may be one storage unit, or separate storage units as shown in FIG. 1. The storage unit 120 and the measurement bases storage 115 may be any type of device capable of storing information such as an optical disk, Read-only memory (ROM), Random-access memory (RAM), hard drive, flash memory, or any other computer memory unit, for example. The transmitter 125 may receive the compressive measurements from the storage unit 120 and/or from the spatial and temporal integrator 110.

The transmitter 125 may transmit the compressive measurements over a network that supports a video transmission application. The network may be any known transmission, wireless or wirelined, network. For example, the network may be a wireless network which includes a radio network controller (RNC), a base station (BS), or any other known component necessary for the transmission of video data over the network from one device to another device. The video transmission application part of the network may include Digital Video Broadcasting-Handheld (DVB-H), Digital Video Broadcasting-Satellite services to Handhelds (DVB-SH), Long Term Evolution (LTE) or evolved Multimedia Broadcast and Multicast Services (eMBMS), for example. One device may transmit video information to another device via a dedicated or shared communication channel.

Figure 2:
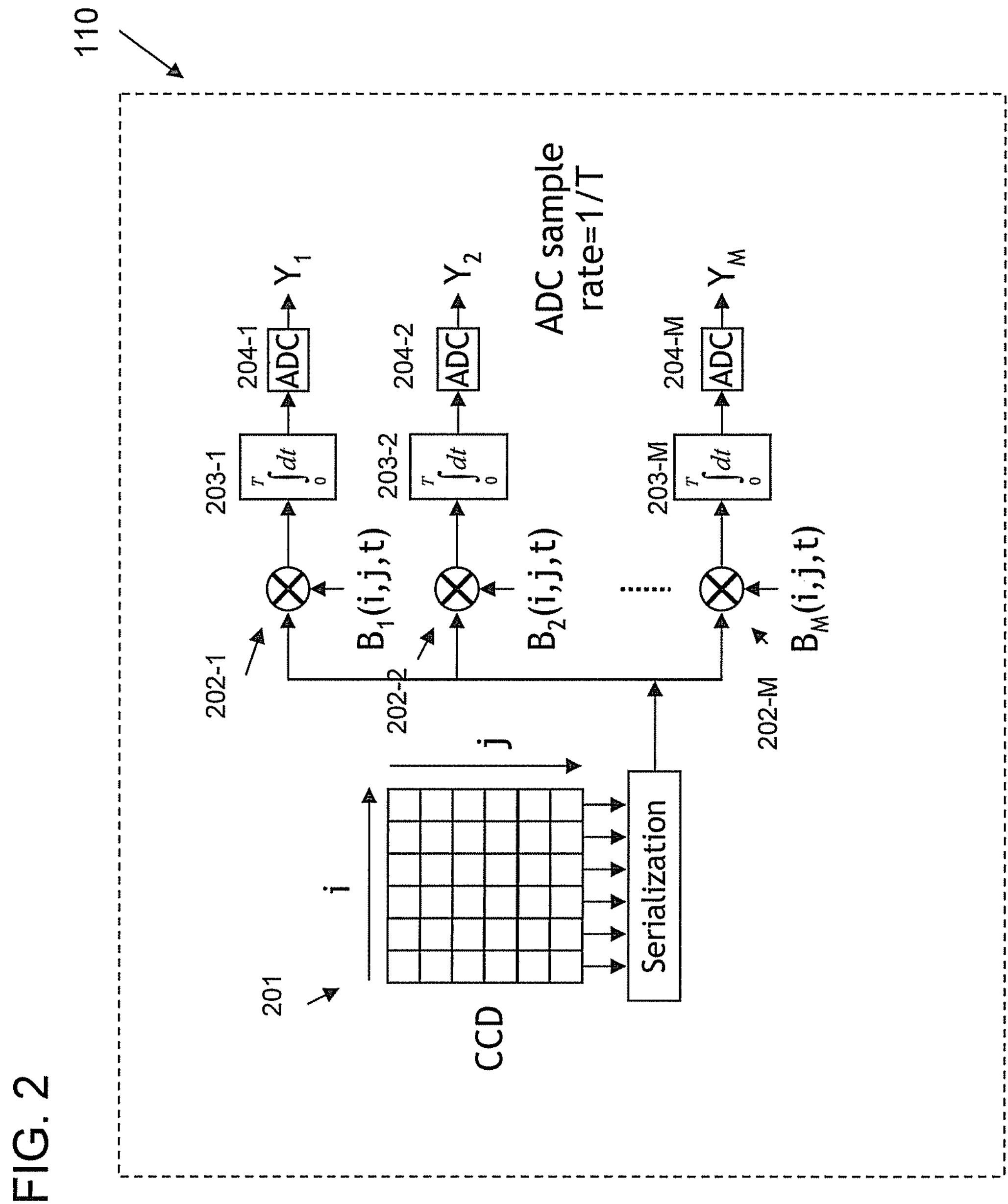
FIG. 2 illustrates the spatial and temporal integrator according to an embodiment of the present invention.

FIG. 2 illustrates the spatial and temporal integrator 110 according to an embodiment of the present invention. The spatial and temporal integrator 110 includes a detector and a spatial and temporal integrator unit. The detector includes a charge-coupled device (CCD) 201. The spatial and temporal integrator unit includes a plurality of multipliers 202, a plurality of integrators 203, and a plurality of analog-to-digital convertors (ADC) 204. The CCD 201 is connected to each of the multipliers 202. Each multiplier 202 is connected to a corresponding integrator 203, which is connected to a corresponding ADC 204.

The CCD 201 receives optical data from the optical lens 105, and detects luminance values of the temporal video structure V(i,j,t) over the period of time T. The temporal video structure V(i,j,t) has pixels with horizontal dimension i and vertical dimension j and with corresponding luminance values over the period of time T. The spatial and temporal integrator 110 obtains the information from the CCD 201 by serialization, in which the 2-dimensional (2D) array of pixel values from the CCD 201 are arranged to be transferred to each of the multipliers 202 in sequence (e.g., one value at a time). Each of the multipliers 202 receives the serialized temporal video structure V(i,j,t), one pixel at a time, and a corresponding measurement basis B(i,j,t).

The number of multipliers 202 corresponds to the number of measurement bases M. For instance, each multiplier 202 receives the serialized temporal video structure V(i,j,t) and a different measurement basis ($B_1$ to $B_M$). Each assigned value of $B_m$(i,j,t) may be a binary number of 0 or 1, or any other number. When each assigned value of $B_m$(i,j,t) is a binary number, the multipliers 202 in each branch operate as on/off switches. The temporal video structure V(i,j,t) is multiplied by each of the set of measurements $B_1$ (i,j,t) to $B_M$ (i,j,t), and the resulting values from each respective multiplier 202 are summed up over the period of time T to generate a set of measurements. The summed results for each measurement basis is the set of measurements. In other words, each corresponding integrator 203 integrates values from a corresponding multiplier 202 over the time period 0 to T. Each ADC 204 converts the summed values into a digital signal, which is the set of measurements $Y_1$ to $Y_M$. The set of measurements $Y_1$ to $Y_M$ is coded data representing temporal video structure.

Figure 3:
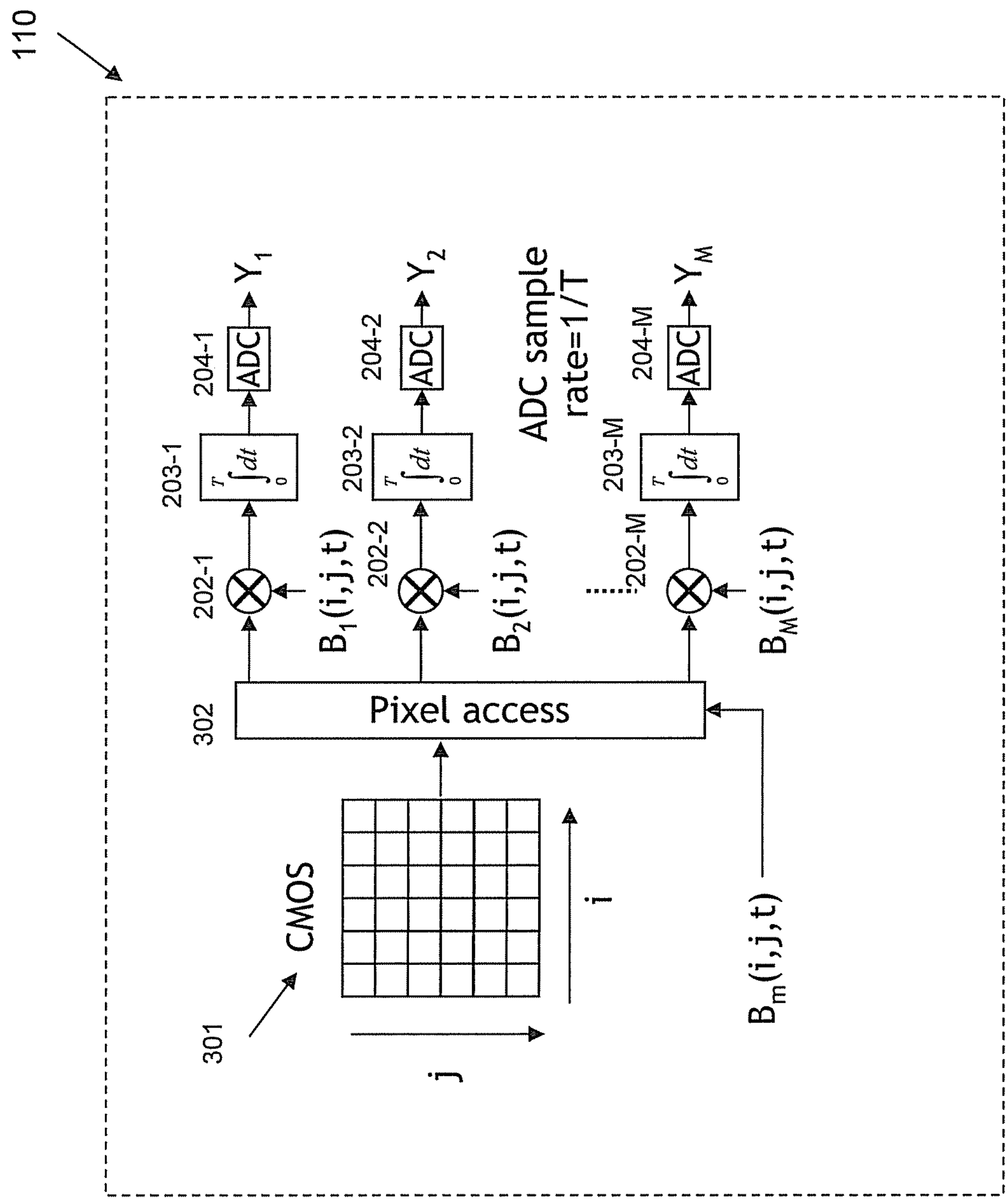
FIG. 3 illustrates the spatial and temporal integrator according to another embodiment of the present invention.

FIG. 3 illustrates the spatial and temporal integrator 110 according to another embodiment of the present invention. In this embodiment, the detector includes a complementary metal-oxide-semiconductor (CMOS) 301. The spatial and temporal integrator unit includes a pixel access 302, the plurality of multipliers 202, the plurality of integrators 204, and the plurality of ADCs 204. The apparatus 100 forms the temporal video structure V(i,j,t) on the CMOS 301. For example, the CMOS 301 receives optical data from the optical lens 105, and detects luminance values of the temporal video structure V(i,j,t) over the period of time T. As described above, the temporal video structure V(i,j,t) has pixels with horizontal dimensions i and vertical dimension j, and with corresponding luminance values over the period of time T.

The pixel access 302 accesses the pixels in the CMOS 301 based on the set of measurement bases $B_m$(i,j,t) as long as one of the assigned values in each measurement basis ($B_1$-$B_M$) is not zero. For example, each assigned value of $B_m$(i,j,t) may be a binary number of 0 or 1, or any other number. When each assigned value of $B_m$(i,j,t) is the binary number, the pixel access 302 accesses pixels values at location (i,j) if the assigned value of $B_m$(i,j,t) is not zero. The pixel access 302 does not access the pixels at location (i,j) if the assigned value of $B_m$(i,j,t) is zero. Each detected pixel value from the CMOS 301 is transferred to each of the M multipliers 202 by the pixel access 302 according to the received set of measurement bases $B_m$(i,j,t). At each multiplier 202, the detected pixel value is multiplied by the corresponding value of the measurement basis $B_m$(i,j,t). However, when the assigned values of the set of measurement bases $B_m$(i,j,t) are binary numbers, the multipliers 202 operate as pass-though devices. The pixel values that pass through each multiplier 202 are summed up over the period of time T to generate the set of measurements. The summed results for each measurement basis is the set of measurements. Because the ADCs 204 operate in the same manner as described above, a detailed discussion is omitted for the sake of brevity.

Figure 4:
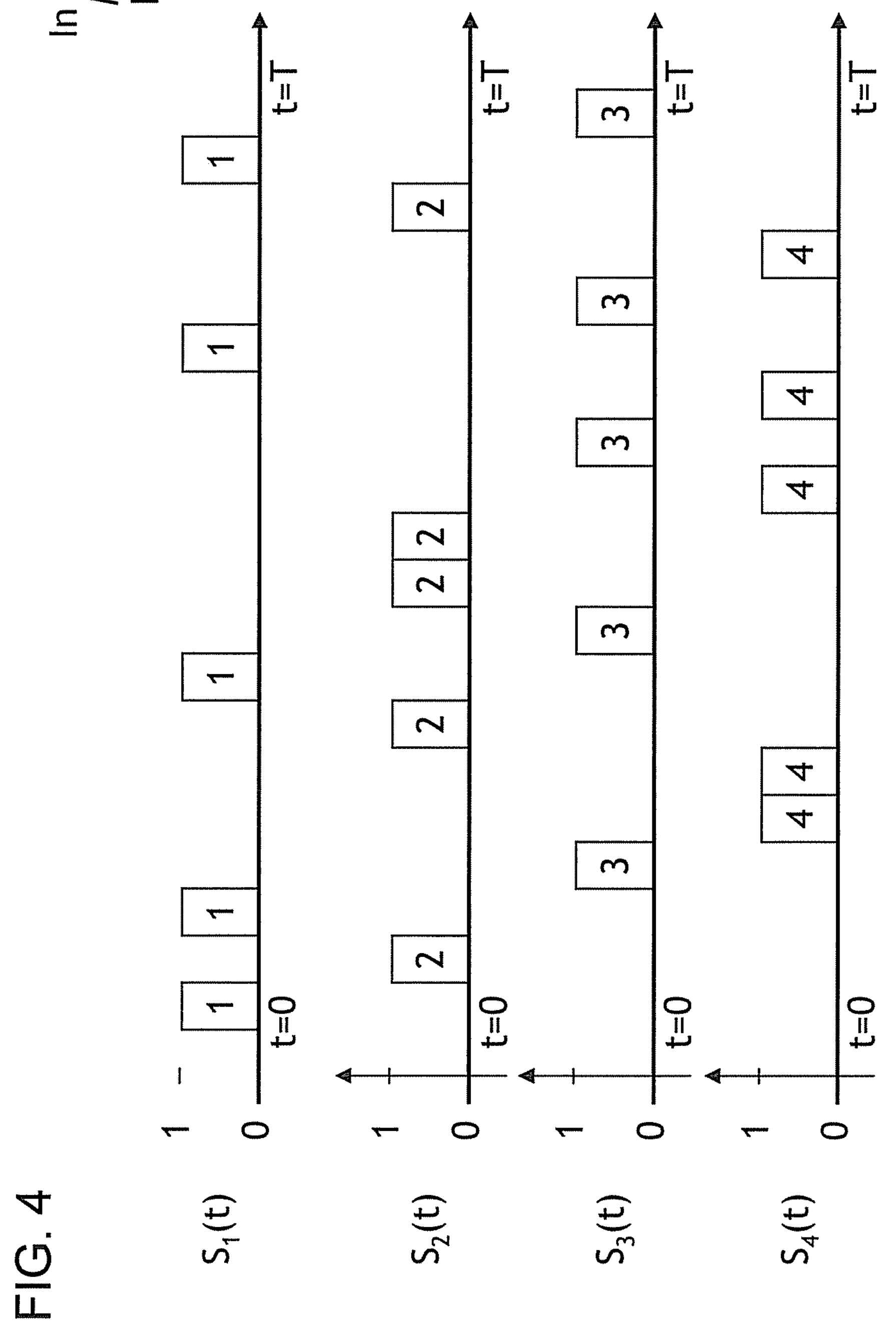
FIG. 4 illustrates timing diagrams showing a time division measurement basis according to an embodiment of the present invention.

FIG. 4 illustrates timing diagrams showing a time division measurement basis according to an embodiment of the present invention.

In this embodiment, each measurement basis includes a basis component having first assigned values, and a time division component having a plurality of non-overlapping time slots of equal length within the period of time. The time slots have second assigned values. For example, as shown in FIG. 4, the set period of time T is divided into the plurality of non-overlapping time slots of equal length. Then, at least some of the time slots are randomly assigned a binary value of 1 in each time division component $S_1(t)$-$S_M(t)$. The various assigned values of the basis component P(i,j,t) is the same for each measurement basis (1 to M). The assigned values in the time slots for the time division component $S_m(t)$ may change for each measurement basis (1 to M). For example, the set of measurement bases $B_m(i,j,t)$ is represented by the following equation:

$$B_m(i,j,t)=P(i,j,t)S_m(t), m=1, 2 \ldots M$$

M is the number of measurement bases. P(i,j,t) is a random binary function of three variables and $S_m(t)$ is a binary function of one variable for each measurement basis, as further described below.

As shown in FIG. 4, the time interval [0,T] is divided into kM non-overlapping time slots of equal length, and randomly assigned k time slots to each of m=1, 2 . . . M. The parameter k may be an integer greater or equal to 1. $D_m$ is the collection of the k time slots associated with m. In one embodiment, $S_m(t)$ is 1 during the k time slots $D_m$, and is zero outside of $D_m$.

Figure 5:
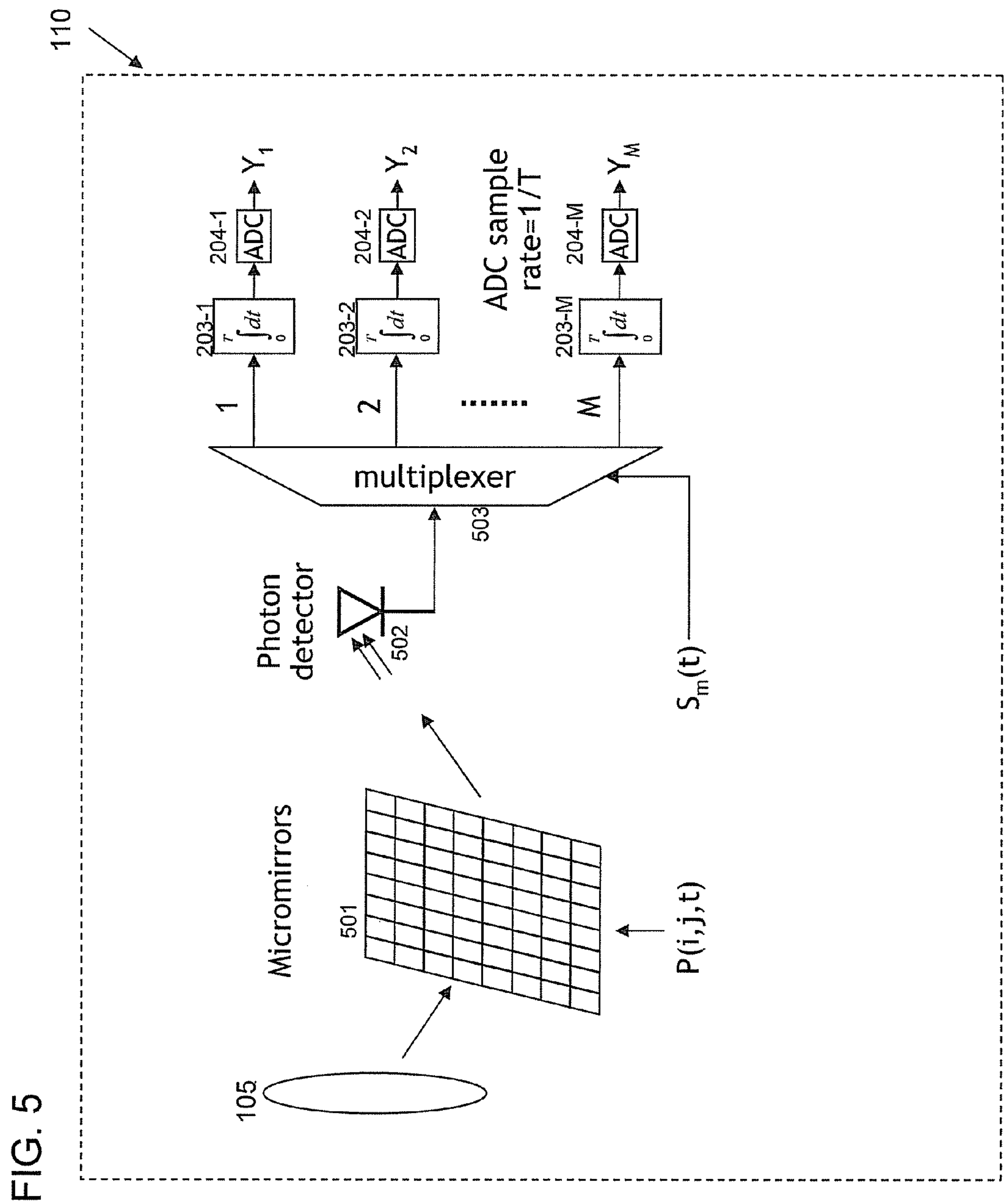
FIG. 5 illustrates the spatial and temporal integrator according to another embodiment of the present invention.

FIG. 5 illustrates the spatial and temporal integrator 110 according to another embodiment of the present invention. In this embodiment, the detector includes micromirrors 501 and a photon detector 502. The spatial and temporal integrator unit includes a multiplexer 503, the plurality of integrators 203 and the plurality of ADCs 204. In this embodiment, the basis component P(i,j,t) having first assigned values of the measurement bases $B_m(i,j,t)$ is provided, to the micromirrors 501.

Each of the assigned values of the basis component P(i,j,t) is a binary number of 0 or 1. A value of 1 for the basis component P(i,j,t) indicates that the micromirrors 501 at location (i,j) at time t is turned to an angle so that the optical data from the optical lens 105 is directed to the photon detector 502. A value of 0 for basis component P(i,j,t) indicates that the micromirrors 501 at location (i,j) at time t is turned to an angle so that the light from the optical lens 105 is not directed to the photon detector 502. As such, the photon detector 502 detects the luminance values of the temporal video structure V(i,j,t) as indicated by the first assigned values of the basis component P(i,j,t) of the measurement basis $B_m(i,j,t)$. In other words, the photon detector 502 detects light intensity of the combined light source reflected from those micomirrors with corresponding basis component P(i,j,t) equal to 1. Those micomirrors with corresponding basis component P(i,j,t) equal to 0 direct light away from the photon detector 502. The result from the photon detector 502 represents the spatial integration of light from the object with corresponding measurement basis P(i,j,t).

The multiplexer 503 selects the luminance values received by the photon detector 502 based on the second assigned values of the time division component $S_m(t)$ of the measurement basis $B_m(i,j,t)$. Each second assigned values of the time division component $S_m(t)$ includes binary values of 0 or 1. When the time division component $S_m(t)=1$ at time instant t, the multiplexer 503 transfer the value from the photon detector 502 to integrator 203-*m*. For example, at time instance t, if the time division component $S_1(t)=1$, then the value from photon detector 502 is transferred to integrator 203-1. On the other hand, if the time division component $S_2(t)=1$, then the value from photon detector 502 is transferred to integrator 203-2. Because the time division component $S_m(t)$ is constructed by using non-intersecting time slots, at each given time instance, the value from the photon detector is transferred to only one of the integrators 203.

The integrators 203 sum the accessed luminance values for each measurement basis over the period of time T to generate the set of measurements. Because the ADCs 204 operate in the same manner as described above, a detailed discussion is omitted for the sake of brevity.

Figure 6:
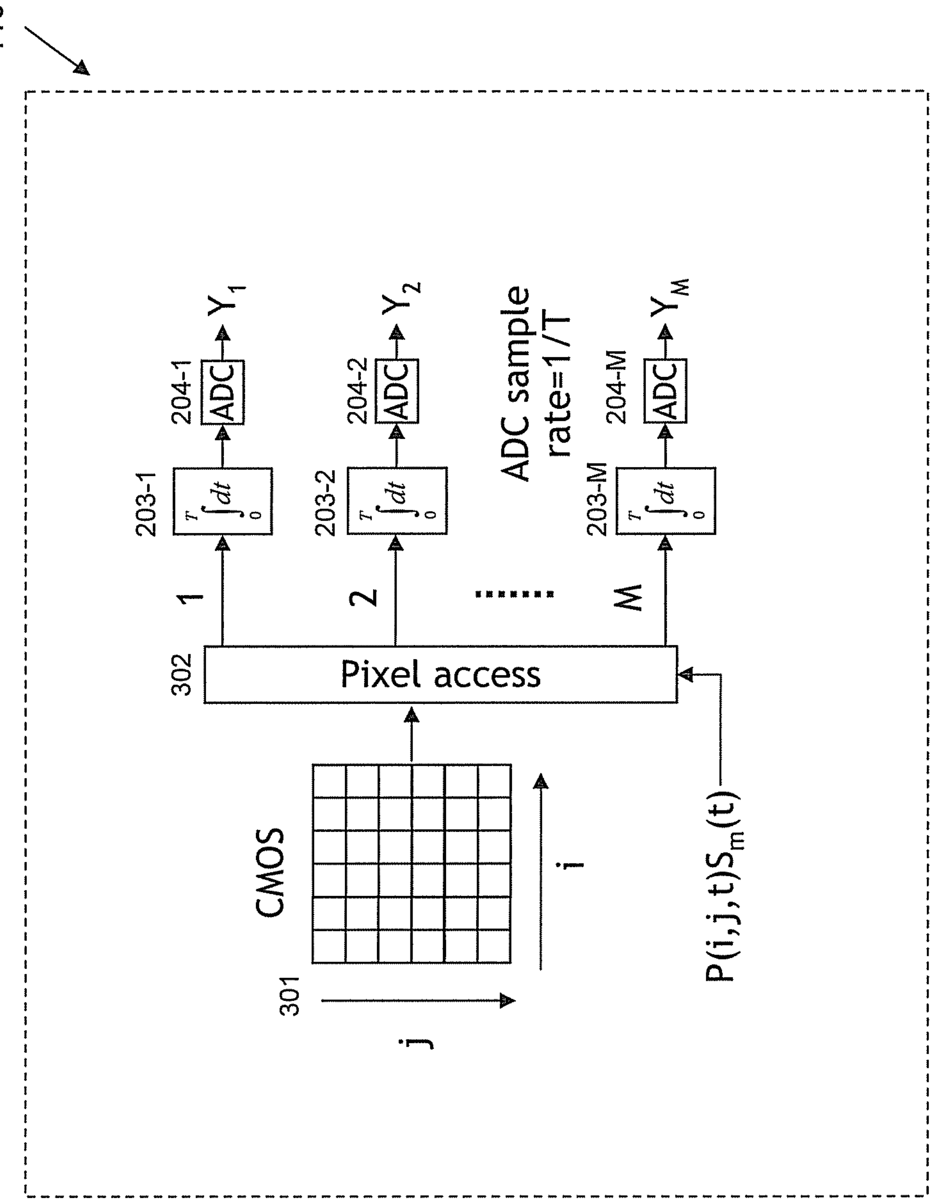
FIG. 6 illustrates the spatial and temporal integrator according to another embodiment of the present invention.

FIG. 6 illustrates the spatial and temporal integrator 110 according to another embodiment of the present invention. FIG. 6 is similar to FIG. 3 of the present invention except the pixel access 302 access the pixel values of the CMOS 301 based on the time division measurement basis of FIG. 4. Because both the basis component P(i,j,t) and the time division component $S_m(t)$ have binary values of 0 or 1, the multipliers 202 are omitted. When the measurement basis P(i,j,t) $S_m(t)=1$ at the time instance t, the pixel access 302 transfers the pixel value from location (i,j) of the CMOS 301 to integrator 203-*m*. For example, at time instance t, if P(1,2,t)$S_1(t)$=1, then the pixel value from location (1,2) of the CMOS 301 is transferred to integrator 203-1. On the other hand, if P(3,2,t)$S_2(t)$=1, then the pixel value from location (3,2) of the CMOS 301 is transferred to integrator 203-2. Because $S_m(t)$ is constructed by using non-intersecting time slots, at each given time instance, the pixel value from any CMOS location is transferred to only one of the integrators 203. Because the integrators 203 and the ADCs 204 operate in the same manner as described above, a detailed discussion is omitted for the sake of brevity.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. An apparatus for generating compressive measurements of video data using spatial and temporal integration, the apparatus comprising:

a detector configured to detect luminance values of a temporal video structure over a period of time based on optical data, the temporal video structure having pixels with a horizontal dimension and a vertical dimension with corresponding luminance values over the period of time; and a spatial-temporal integrator unit configured to receive a plurality of measurement bases, each measurement basis having same horizontal and vertical dimensions as the temporal video structure with corresponding assigned values over the period of time, the spatial-temporal integrator unit configured to apply each measurement basis to the temporal video structure and to sum resulting values for each measurement basis over the period of time to obtain a set of measurements, the summed values for each measurement basis being the set of measurements.

2. The apparatus of claim 1, wherein the spatial-temporal integrator unit comprises:

a plurality of multipliers, each multiplier being configured to multiply the detected luminance values of the temporal video structure with a corresponding measurement basis; and a plurality of integrators, each integrator connected to a corresponding multiplier and configured to sum output of the corresponding integrator over the period of time.

3. The apparatus of claim 1, wherein the spatial-temporal integrator unit comprises:

a pixel access configured to receive the plurality of measurement bases and access the luminance values detected by the detector based on the assigned values of the measurement bases;

a plurality of multipliers, each multiplier being configured to multiply the accessed luminance values of the temporal video structure with a corresponding measurement basis; and a plurality of integrators, each integrator connected to a corresponding multiplier and configured to sum output of the corresponding integrator over the period of time.

4. The apparatus of claim 1, wherein each measurement basis includes a basis component having first assigned values, and a time division component having a plurality of non-overlapping time slots of equal length within the period of time, the time slots having second assigned values.

5. The apparatus of claim 4, wherein the spatial-temporal integrator unit comprises:

a photon detector is configured to detect luminance values based on the first assigned values;

a multiplexer configured to select at least one of the detected luminance values based on the second assigned values; and a plurality of integrators configured to sum the selected luminance values for each measurement basis over the period of time.

6. The apparatus of claim 4, wherein the spatial-temporal integrator unit comprises:

a pixel access configured to access the luminance values detected by the detector based on the first and second assigned values; and a plurality of integrators configured to sum the accessed luminance values for each measurement basis over the period of time.

7. The apparatus of claim 4, wherein the first and second assigned values are binary values of 0 or 1.

8. The apparatus of claim 1, wherein the detector includes a charge-coupled device (CCD).

9. The apparatus of claim 1, wherein the detector includes a complementary metal-oxide-semiconductor (CMOS).

10. The apparatus of claim 1, wherein the detector includes micromirrors.

11. The apparatus of claim 1, wherein the set of measurement bases is constructed using a randomly permutated Walsh-Hadamard matrix.

12. The apparatus of claim 1, wherein the assigned values are binary values of 0 or 1.

13. A method for generating compressive measurements of video data using spatial and temporal integration, the method comprising:

detecting, by a detector, luminance values of a temporal video structure over a period of time based on optical data, the temporal video structure having pixels with a horizontal dimension and a vertical dimension with corresponding luminance values over the period of time;

receiving, by a spatial-temporal integrator unit, a plurality of measurement bases, each measurement basis having same horizontal and vertical dimensions as the temporal video structure with corresponding assigned values over the period of time;

applying, by the spatial-temporal integrator unit, each measurement basis to the temporal video structure; and summing, by the spatial-temporal integrator unit, resulting values over the period of time for each measurement basis to obtain a set of measurements, the summed values for each measurement basis being the set of measurements.

14. The method of claim 13, further comprising:

multiplying, by the spatial-temporal integrator unit, the detected luminance values of the temporal video structure with a corresponding measurement basis; and summing, by the spatial-temporal integrator unit, results of the multiplying step over the period of time for each measurement basis.

15. The method of claim 13, further comprising:

accessing, by the spatial-temporal integrator unit, the luminance values detected by the detector based on the assigned values of the measurement bases;

multiplying, by the spatial-temporal integrator unit, the accessed luminance values of the temporal video structure with a corresponding measurement basis; and summing, by the spatial-temporal integrator unit, results of the multiplying step over the period of time for each measurement basis.

16. The method of claim 13, wherein each measurement basis includes a basis component having first assigned values, and a time division component having a plurality of non-overlapping time slots of equal length within the period of time, the time slots having second assigned values.

17. The method of claim 16, further comprising:

detecting, by the detector, luminance values based on the first assigned values;

selecting, by the spatial-temporal integrator unit, at least one of the detected luminance values based on the second assigned values; and summing, by the spatial-temporal integrator unit, the selected luminance values for each measurement basis over the period of time.

18. The method of claim 16, further comprising:

accessing, by the spatial-temporal integrator unit, luminance values detected by the detector based on the first and second assigned values; and summing, by the spatial-temporal integrator unit, the accessed luminance values for each measurement basis over the period of time.

19. The method of claim 16, wherein the first and second assigned values are binary values of 0 or 1.

20. The method of claim 13, wherein the set of measurement bases is constructed using a randomly permutated Walsh-Hadamard matrix.

* * * * *